(12) United States Patent
Bülow

(10) Patent No.: US 7,224,900 B2
(45) Date of Patent: May 29, 2007

(54) ACTIVELY STABILIZED TIME MULTIPLEXER

(75) Inventor: Henning Bülow, Kornwestheim (DE)

(73) Assignee: Alcatel, Paris (FR)

( * ) Notice: Subject to any disclaimer, the term of this patent is extended or adjusted under 35 U.S.C. 154(b) by 702 days.

(21) Appl. No.: 10/423,979

(22) Filed: Apr. 28, 2003

(65) Prior Publication Data

US 2003/0223753 A1    Dec. 4, 2003

(30) Foreign Application Priority Data

May 31, 2002    (EP) ................... 02360159

(51) Int. Cl.
*H04J 14/00*    (2006.01)
(52) U.S. Cl. .............. 398/47; 398/48; 398/53
(58) Field of Classification Search .......... 398/47–48, 398/52–53, 65, 75, 79
See application file for complete search history.

(56) References Cited

U.S. PATENT DOCUMENTS

| 4,634,858 | A | | 1/1987 | Gerdt et al. |
| 5,050,167 | A | * | 9/1991 | Izadpanah ............... 370/535 |
| 5,917,628 | A | * | 6/1999 | Ooi et al. .................. 398/98 |
| 6,760,524 | B2 | * | 7/2004 | Mukai ..................... 385/122 |

FOREIGN PATENT DOCUMENTS

| EP | 0438237 A2 | 7/1991 |
| EP | 1119119 A1 | 7/2001 |

OTHER PUBLICATIONS

M. Nakazawa, et al.: "1.28Tbit/s-70km OTDM Transmission Using Third- and Fourth-Order Simultaneous Dispersion Compensation with a Phase Modulator", Electronics Letters, Nov. 23, 2000, vol. 36, No. 24, pp. 2027-2028.

I. Morita et al: "Study on Optimum OTDM Signals for Long-Distance 40 Gbit/s Transmission", OFC 2002, Tuesday Morning, pp. 5-6.

K-L Deng et al, "A 1024-Channel Fast Tunable Delay Line for Ultrafast All-Optical TDM Networks", IEEE Photonics Technology Letters, IEEE, Inc., New York, US, vol. 9, No. 11, Nov. 1, 1997, . 1496-1498, XP000722982.

Q. Z. Liu, "10.6 Gbit/s 2:1 time division multiplexer using dual gage GaAs MESFETs", Center for Broadband Telecommunications, XP010004589.

* cited by examiner

*Primary Examiner*—Dzung Tran
(74) *Attorney, Agent, or Firm*—Sughrue Mion, PLLC

(57) ABSTRACT

An optical time multiplexer for generating an N Gbits/s output signal (36) from n data modulated input pulse streams (21, 22) with a pulse frequency of N/n GHz, where n∈IN and n≧2, with a combiner device for passively interleaving the n input pulse streams (21, 22) is characterized by at least n–1 first phase shifting elements (25) tuning the optical phases of at least n–1 input pulse streams (22) and being connected to a controller device (32), which derives at least n–1 control signals from a comparison of the optical phases of the n input pulse streams (21, 22) and controls the at least n–1 first phase shifting elements (25) such that the optical phases of all n input pulse streams (21, 22) are locked with respect to each other. This optical time multiplexer reduces the drifting penalty of ODTM signals due to multiplexer instability, it prohibits the broadening of RZ pulses, and it grants the possibility to easily generate carrier-suppressed RZ signals or similar modulation formats.

15 Claims, 4 Drawing Sheets

ACTIVELY STABILIZED TIME MULTIPLEXER

BACKGROUND OF THE INVENTION

The invention is based on a priority application EP 02 360 159.4 which is hereby incorporated by reference.

The invention relates to an optical time multiplexer for generating an N Gbit/s output signal from n data modulated input pulse streams with a pulse frequency of N/n GHz, where nϵIN (IN=natural series) and n≧2, with a combiner device for passively interleaving the n input pulse streams.

An optical time multiplexer of that type and the related method of signal transmission was described by M. Nakazawa, T. Yamamoto and K. R. Tamura in ECOC 2000, presentation 2.6; see also Electron. Lett. 36, p. 2027–2028 (2000).

The optical time multiplex technique is a method for transmitting a plurality of channels as a single optical signal. For coding, the signals of the channels are interleaved into the single optical signal. The optical demultiplexing by gating of the single optical signal according to a fixed time schedule allows the recovery of the original channel information.

In order to generate e.g. a 160 Gbit/s RZ (return to zero) signal out from four 40 GHz pulse streams, the four 40 Gbit/s RZ pulse streams are passively interleaved in a combiner (coupler) device after introducing proper mutual delay times of 0, ¼, ½ and ¾ bit periods (one bit period=25 ps) to the four signals.

Production tolerances of the equipment and temperature drift usually leads to non-constant optical phases between the four signals which leads to non-constant interference between different bits and thus to drifting and worst-case signal distortion. This must be taken into account by using very short pulses with a 30 dB extinction at the position of an adjacent bit, so the interference can be neglected. However, such short pulses are highly susceptible to dispersion,. Moreover, the non-constant optical phases between the four signals lead to a strong penalty at the receiver after pulse broadening due to dispersion.

Nakazawa et al. used very short pulse widths on the order of 200 fs and a complex pre-chirping technique applying a grating pair, a spatial light modulator and a reverse dispersion fiber to compensate for dispersion during multiplexing.

I. Moita and N. Edagawa, OFC 2002, Presentation TuA4, p. 5–6, showed that good long distance transmission (2000 km) properties of optical time division multiplex (OTDM) signals can be achieved with carrier suppressed RZ signals having a phase shift of 180° between two interleaved channels. However, the generation of carrier suppressed RZ signals suffers from the same difficulties as the generation of time multiplexed signals in general.

It is the object of the invention to present an optical time multiplexer which reduces the drifting penalty of ODTM signals due to multiplexer instability, and which avoids worst-case distortions which are likely in the case of broad RZ pulses with non-constant mutual phase differences, and which grants the possibility to easily generate carrier-suppressed RZ signals or similar modulation formats.

SUMMARY OF THE INVENTION

As far as devices are concerned, this object is achieved by an optical time multiplexer introduced above, characterized by at least n−1 first phase shifting elements tuning the optical phases of at least n−1 input pulse streams and being connected to a controller device, which derives at least n−1 control signals from a comparison of the optical phases of the n input pulse streams and controls the at least n−1 first phase shifting elements such that the optical phases of all n input pulse streams are locked with respect to each other.

In the inventive optical time multiplexer, the optical phases of the individual input data streams are compared to each other in a reference coupler, which outputs the differential signals between these data streams. After a low speed optical detection, these differential signals can be used in a control unit to command the first phase shifting elements in order to stabilize the optical phases of the input data streams.

This allows the use of broader (i.e. longer) pulses of the RZ signal for transmission. Moreover, higher chromatic dispersion of the RZ signal can be tolerated.

In summary, an increased span length, PMD tolerance and chromatic dispersion tolerance can be achieved.

For the detection of the differential signals, low speed (and therefore low cost) detectors such as photodiodes can be used for stabilization. Their differential bipolar output keeps the necessary control logic simple.

In a preferred embodiment of the inventive optical time multiplexer is N≧1, in particular N≧10, preferably N≧40. The number of input pulse streams is proportional to the bit rate, i.e. the information flow of the multiplexed output signal. For high values of N, i.e. high bit rates, the advantages of the invention are particularly relevant.

Another preferred embodiment is characterized in that a reference coupler for the comparison of the phases of the n input pulse streams is provided converting the phase variations between the phases of the n input pulse streams into signal amplitude variations which are fed as an input to the controller device. The reference coupler is a simple means for comparing the optical phases of the input pulse streams.

In a variant of this embodiment the reference coupler is part of an integrated optical chip comprising the combiner device and preferably also the at least n−1 first phase shifting elements. This leads to a compact construction.

In an alternative variant of said embodiment low speed photo diodes are provided for converting the output signals of the reference coupler into electrical signals which are inputted to the controller device. Low speed photo diodes are a particularly inexpensive means for the conversion of the signals of the reference coupler.

A further preferred embodiment of the inventive optical time multiplexer is provided with at least n−1 time delay elements for interleaving the signals of the n input pulse streams. The time delays introduced by the time delay elements may either be variable, in particular adaptable, or fixed. The delay time typically amounts to a 1 bit period of the N Gbit/s output data stream. The delay elements allow a well-defined and purposeful choice of time delays without preliminary measurements.

An embodiment also in accordance with the invention is characterized in that at least n−1 time delay elements are disposed before the input of the controller device for shifting the signals of the n input pulse streams into time positions such that phase comparison between the signals of the n input pulse streams can be accomplished. The comparison of the phases between the input signals is then possible even if the input pulse widths are smaller than or in the order of the differences of the time positions of the input pulses.

A further, highly preferred embodiment of the inventive optical time multiplexer is characterized in that at least n−1 second phase shifting elements are provided for adjusting the relative phases of the n input pulse streams. Thus non-zero phase shifts can be accomplished. The phase shifts introduced may be fixed or variable and/or adjustable. A 180° phase shift can be used to generate a carrier suppressed RZ output signal which has superior transmission characteristics.

In another embodiment the first and/or second phase shifting elements and/or the time delay elements are realized as thermooptical tuning elements, preferably integrated on an optical substrate of the combiner device. Thermooptical tuning elements are standard means of high availability that can be integrated onto an optical substrate to give a compact construction.

The invention is also realized in a method for operating an optical time multiplexer as described above, characterized by processing the input signals of the controller device in a differential scheme for providing bipolar signals inside the controller device in order to generate the at least n−1 control signals at the output thereof. The bipolar signal allows a relatively simple control logic.

An alternative method for operating an optical time multiplexer as described above in accordance with the invention is characterized by locking the phases of all n input pulse streams with respect to each other at phase differences of 0°. This gives the simplest phase correlation of the input data streams possible.

Another inventive method for operating an optical time multiplexer as described above is characterized by locking the phases of all n input pulse streams with respect to each other at phase differences of non-zero values, in particular of 180° for a carrier suppressed modulation format. The 180° phase difference leads to the carrier suppressed signal mode which offers excellent long range transmission properties. (In the case of e.g. n=4 a phase difference of 90 degrees)

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

BRIEF DESCRIPTION OF THE DRAWINGS

The invention is shown in the drawings.

FIG. 1 shows the basic structure of a prior art optical 4:1 time multiplexer combining four data streams to generate a N Gbit/s RZ signal, e.g. a 160 Gbit/s RZ signal.

The optical pulse source 11 generates an optical wave with a frequency of N/4 GHz, i.e. in the chosen example 40 GHz. This signal is spread over 4 separate lines (waveguides) 12a–12d and fed into a set of four modulators 13a–13d. The modulators 13a–13b modulate the information to be transported (which consists of four N/4 Gbit/s ETDM signals) onto the branches of the optical signal. The information is provided from outside the optical time multiplexer by a set of information lines 15. Thus, four N/4 Gbit/s optical data streams are generated. The modulators 13a–13d are connected to delay lines 15a–15d which receive the modulated optical signals. The delay time of line 15b is ¼ bit period (of the N/4 Gbit/s data streams) longer than the delay time of line 15a; the delay time of line 15c is ½ bit period longer than the delay time of line 15a; the delay time of line 15d is ¾ bit period longer than the delay time of line 15a. In the example given, one bit period of the 40 Gbit/s data stream is 25 ps. The four modulated and properly delayed data streams (signals) are fed into a combiner 16 which interleaves the data streams to a single multiplexed signal of N Gbit/s, i.e. 160 Gbit/s in the given example.

Temperature drift and production tolerances makes the four signals lose their well-defined phase correlation during the time between their spreading in the lines 12a–12d and their interleaving in the combiner 16. This problem can be solved according to the invention by actively stabilizing the phases of the modulated data streams immediately before they are interleaved in the combiner.

Figure 1:
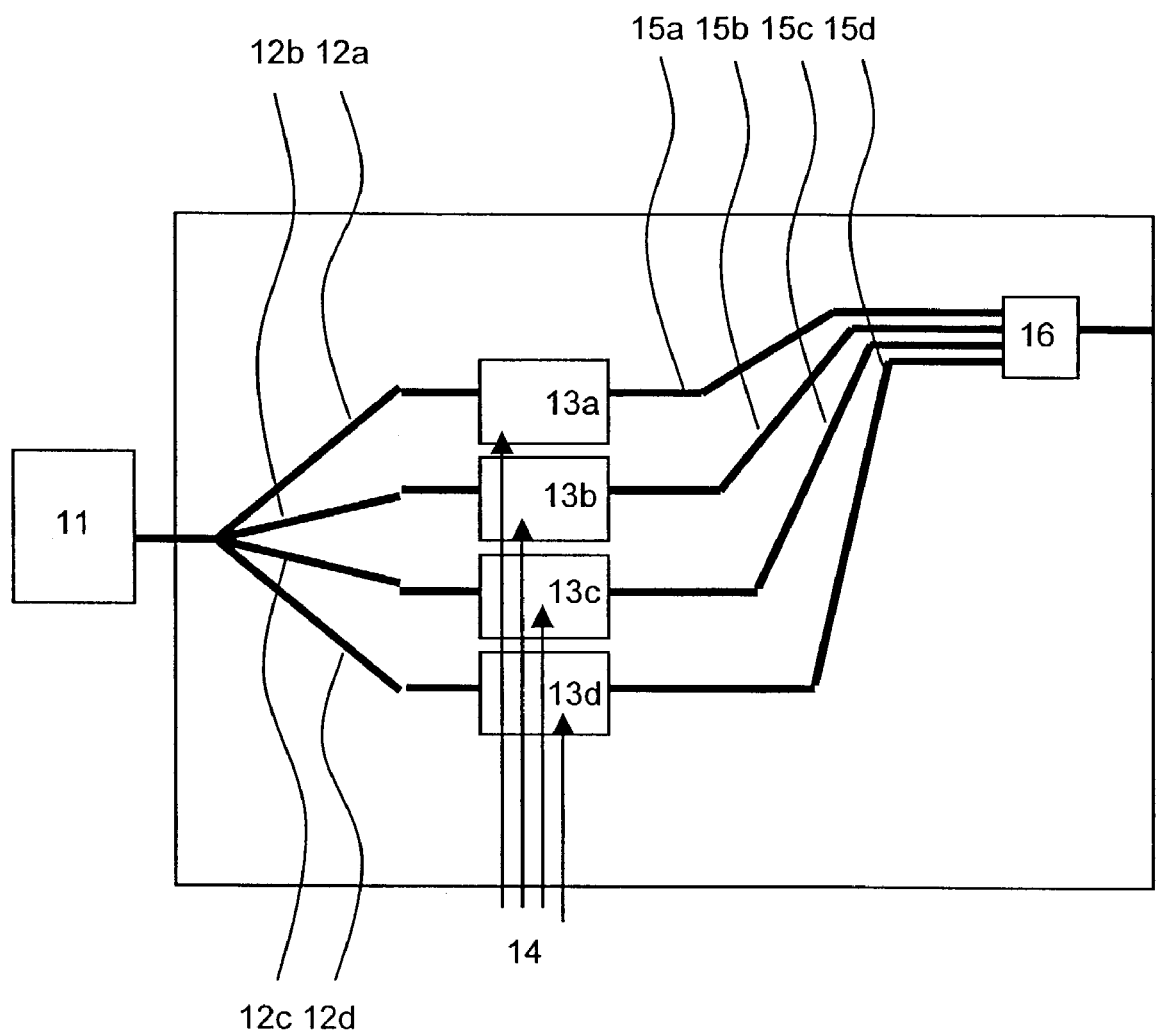
FIG. 1 shows the basic structure of a state of the art 4:1 optical time multiplexer.
Figure 2:
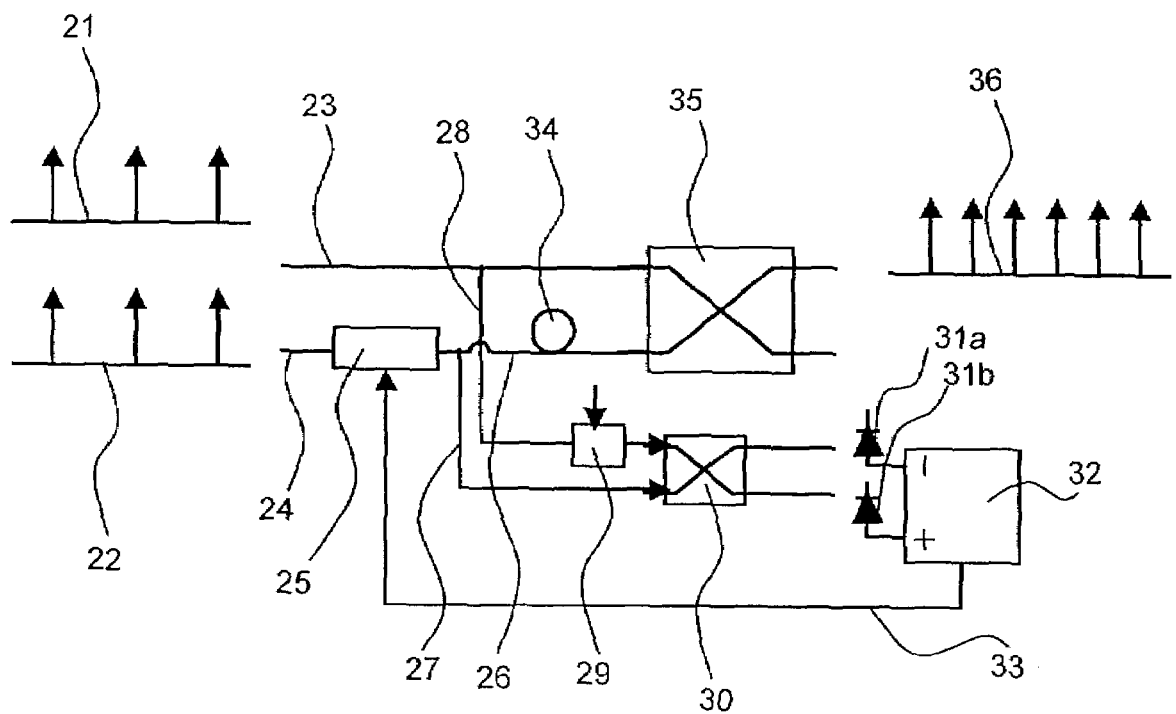
FIG. 2 shows a first embodiment of a combiner part of an actively stabilized 2:1 optical time multiplexer in accordance with the invention.

This can be accomplished with an inventive optical time multiplexer, whose combiner part is shown in FIG. 2. The whole combiner part can be arranged on an integrated optic chip. The embodiment presented belongs to a 2:1 optical time multiplexer, i.e. two streams of input signals 21, 22 are processed. These input signals 21, 22 with a bitrate of M/2 Gbit/s each enter the combiner via input lines 23 and 24. The lower signal 22 is fed into a first phase shifter 25, whose output signal is fed into line 26. A part of the signal of line 26 is tapped by reference line 27; and also part of the signal of the input line 23 is tapped by reference line 28. The signal of reference line 28 is fed into an adjustable second phase shifter 29. Its output signal and the signal of line 27 are both fed into a reference 1:1 coupler 30, where the two signals are interleaved, i.e. brought to interference. The reference 1:1 coupler 30 outputs a differential control signals which are detected by two low speed (and therefore inexpensive) photo diodes 31a, 31b. The differential control signal is processed in an electronic control logic 32 (controller) that drives the first phase shifter 25 via the control line 33. The phase shifters 25, 29 e.g. can be thermooptic tuning elements on the integrated optical substrate of the combiner.

If the electronic control logic 32 detects a phase shift between the input signals 21 and 22 other than the one chosen by the adjustable second phase shifter 29, the controlled first phase shifter 25 adapts its shifting capacity to establish (or reestablish) the desired phase correlation between the two signals. With the adjustable second phase shifter 29, an arbitrary constant non-zero value of the optical phase can be set. A 180° value can be chosen for carrier suppressed modulation format (alternate 0 and 180° phase difference between output bits). By the inventive means, the phase of the lower signal in line 26 is locked with respect to the upper signal in input line 23.

The signals present at input line 23 and line 26 have obtained, in accordance with the invention, the desired phase correlation. In the embodiment presented in FIG. 2, the line 26 switches over to a delay line 34. The corresponding delay time of delay line 34 typically amounts to 1 bit period of the multiplexed (M Gbit/s) signal, but can be adaptable if desired. The delay line 34 and the input line 23 are fed into a signal 1:1 coupler 35 for interleaving the two signals at its input. The signal 1:1 coupler 35 generates the multiplexed signal 36 with a bitrate of M Gbit/s.

Figure 3:
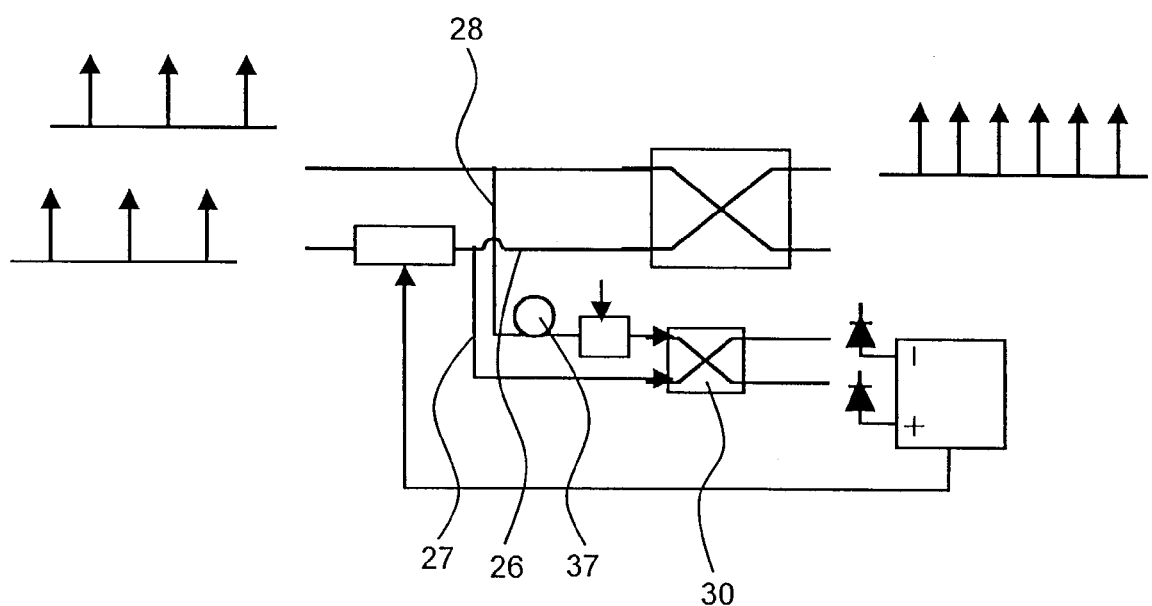
FIG. 3 shows a second embodiment of the invention with a different location of a delay line.

FIG. 3 shows a variant of the combiner part of the inventive optical time multiplexer of FIG. 2. The delay line 34 following line 26 is removed, but a delay line 37 is inserted into reference line 28. This allows the adjustment of the bit positions of the reference signals in the reference lines 27 and 28 before comparing their phases in the reference 1:1 coupler 30.

Figure 4:
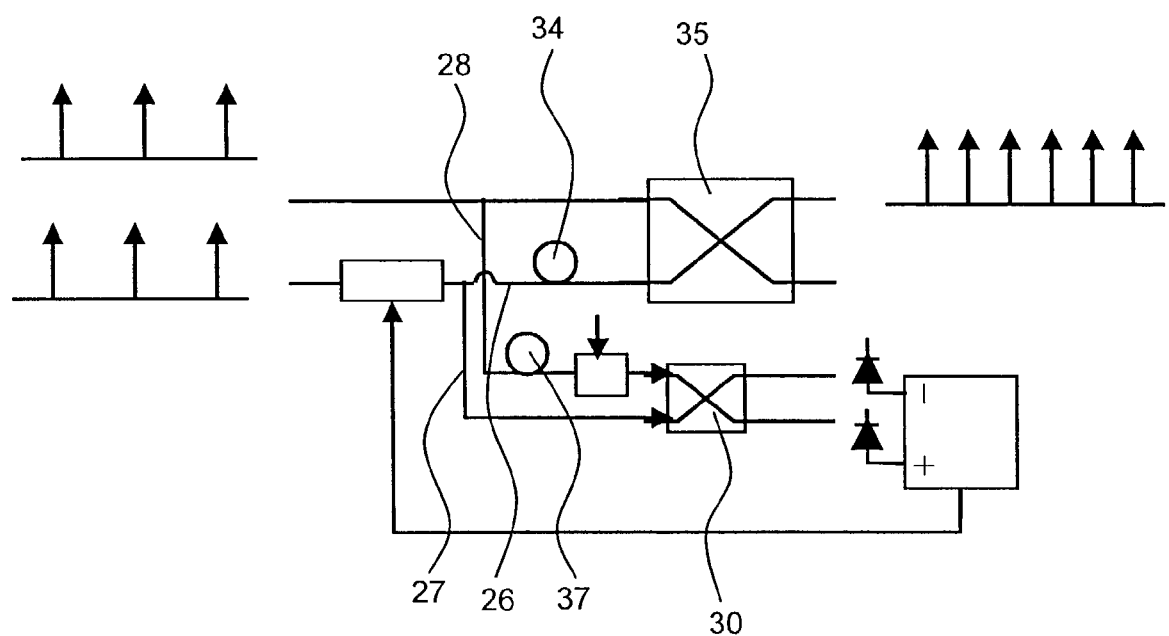
FIG. 4 shows a third embodiment of the invention with an additional delay line.

FIG. 4 shows another variant of the combiner part of the inventive optical time multiplexer of FIG. 2. It comprises both a delay line 34 in line 26 and a delay line 37 in reference line 28. While delay line 37 allows the adjustment of the bit positions of the reference signals in reference lines 27 and 28 before comparing their phases in reference 1:1 coupler 30, delay line 34 allows the adjustment of the bit position of the upper and lower signal before their input into the signal 1:1 coupler 35. The latter is particularly necessary if the bit position adjustment (i.e. the time delay) of the different input data streams (signals) was not or incompletely performed between signal modulation in the modulators 13a–13d and the feeding into the combiner 16 of the optical time multiplexer. For a 2:1 multiplexer, the time delay between the two input signals is typically ½ bit period of the input signals.

The invention claimed is:

1. Optical time multiplexer for generating an N Gbits/s output signal from n data modulated input pulse streams with a pulse frequency of N/GHz, where n∈IN and n≧2, with a combiner device for passively interleaving the n input pulse streams, wherein at least n−1 first phase shifting elements are provided tuning optical phases of at least n−1 input pulse streams and being connected to a controller device, which derives at least n−1 control signals from a comparison of the optical phases of the n input pulse streams and controls the at least n−1 first phase shifting elements such that the optical phases of all n input pulse streams are locked with respect to each other, that a reference coupler for the comparison of the optical phases of the n input pulse streams is provided converting the phase variations between the optical phases of the n input pulse streams into signal amplitude variations which are fed as an input to the controller device, and that reference lines are provided tapping parts of the n input pulse streams and feeding these parts of the n input pulse streams into the reference coupler.

2. Optical time multiplexer according to claim 1, wherein N≧1.

3. Optical time multiplexer according to claim 2, wherein N≧10.

4. Optical time multiplexer according to claim 3, wherein N≧40.

5. Optical time multiplexer according to claim 1, wherein the reference coupler is part of an integrated optical chip comprising the combiner device.

6. Optical time multiplexer according to claim 5, wherein the integrated optical chip further comprises the at least n−1 first phase shifting elements.

7. Optical time multiplexer according to claim 1, wherein low speed photo diodes are provided for converting the output signals of the reference coupler into electrical signals which are inputted to the controller device.

8. Optical time multiplexer according to claim 1, wherein at least n−1 time delay elements are provided for interleaving the signals of the n input pulse streams.

9. Optical time multiplexer according to claim 8, wherein the first and/or second phase shifting elements and/or the time delay elements are realized as thermooptical tuning elements.

10. Optical time multiplexer according to claim 9, wherein the thermooptical tuning elements are integrated on an optical substrate of the combiner device.

11. Optical time multiplexer according to claim 1, wherein at least n−1 time delay elements are disposed before the input of the controller device for shifting the signals of the n input pulse streams into time positions such that phase comparison between the signals of the n input pulse streams can be accomplished.

12. Optical time multiplexer according to claim 1, wherein at least n−1 second phase shifting elements are provided for adjusting the relative phases of the n input pulse streams.

13. A method, comprising:
providing the optical time multiplexer according to claim 1, and
processing the input signals of the controller device in a differential scheme for providing bipolar signals inside the controller device in order to generate the at least n−1 control signals at the output thereof.

14. A method, comprising:
providing the optical time multiplexer according to claim 1, and
locking the optical phases of all n input pulse streams with respect to each other at phase differences of 0°.

15. A method, comprising:
providing the optical time multiplexer according to claim 1, and
locking the optical phases of all n input pulse streams with respect to each other at phase differences of non-zero values, in particular of 180° for a carrier suppressed modulation format.

* * * * *